March 11, 1952     H. J. LANDON     2,589,007
ARTIFICIAL FISH BAIT WITH WEIGHTED HOOK MEMBER
Filed March 21, 1949

INVENTOR.
Harold J. Landon.
BY
Harness, Dickey & Pierce.
ATTORNEYS.

UNITED STATES PATENT OFFICE 2,589,007

ARTIFICIAL FISH BAIT WITH WEIGHTED HOOK MEMBER

Harold J. Landon, Grand Blanc, Mich.

Application March 21, 1949, Serial No. 82,655

2 Claims. (Cl. 43—42.28)

My invention relates to devices for catching fish and, in particular, refers to a fish bait for line fishing.

The two principal objects of my invention are, first, to provide a bait which utilizes the instinctive movements of a fish in attempting to escape a hook to hook the fish; and, secondly, to provide a fish bait which may be fluttered or vibrated in a manner attractive to a fish by simple motion of the line.

The preferred construction for jointly accomplishing these objects is shown by way of illustration in the accompanying drawing, in which.

Figure 1:
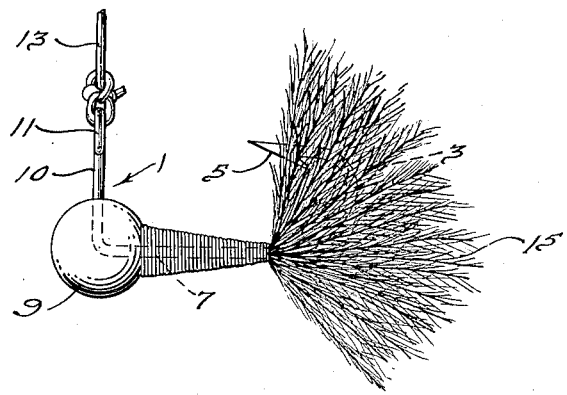
Figure 1 is a side elevation of the improved fish bait.
Figure 2:
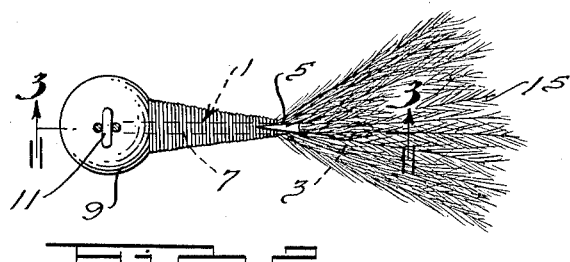
Fig. 2 is a plan view thereof.
Figure 3:
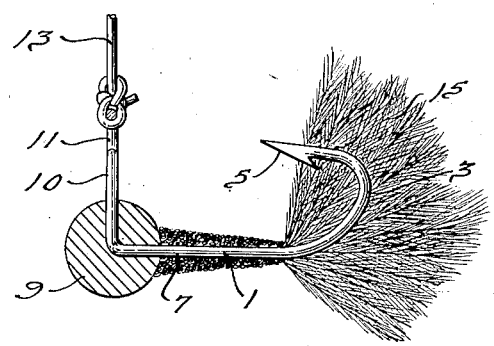
Fig. 3 is a cross section on lines 3—3 of Fig. 2.

The improved fish bait includes a hook member 1 that has a rebent end portion 3 forming the mouth of the hook. This has a barb 5 which is preferably on the inside of the mouth.

The shank 7 of the hook member 1 is rigidly secured to a weight 9 and, if desired, the free end 10 of the shank may extend through the weight 9 and be formed as an eye 11 for receiving the line 13. Alternatively, the eye 11 may comprise a separate member (not shown), rigidly secured to the weight 9, rather than an integral part of the hook member 1. However, the construction illustrated is preferred because of simplicity in manufacture, it being necessary only to bend the end 10 of an ordinary hook, such as may be purchased on the open market, and deposit a globule of solder or the like at the heel of the bend to serve as the weight 9.

The shank 7 of the hook is in all cases nonparallel or nonaxial with respect to the line 13 when the bait is suspended therefrom. It is especially preferred that it extend horizontally to the line 13 with the barb 5 above the shank 7 and in the plane of the shank and line, as illustrated in the drawings. With this construction a fish is able to swallow the hook end 3 without interrupting its normal horizontal course of travel. Furthermore, with the barb 5 above the shank 7, the instinctive movements of the fish in attempting to escape the hook only serve to increase the penetration of the barb. When the fish feels the barb in its mouth, its reaction is to go down or descend into deeper water. This, of course, drives the present hook construction further into the roof of the fish's mouth.

A fan shaped feather 15 is preferably tied to the shank 7 to encompass and hide the hook portion 3 and to serve as a lure. The present bait construction is such that a vibratory motion may be imparted to the hook member 1 so that the feather flutters in a manner which experience has shown is attractive to fish, excellent catches being made with no edible bait of any kind attached to the hook 3. This motion results simply from a gentle tug on the line 13. The hook member 1 with the shank 7 extending laterally from the weight 9 apparently behaves as a compound pendulum which is actuated into vibration by a gentle, sudden tug on the line 13 by the angler. It has been found that this vibration is benefited by having the eye 11 extend slightly above the weight 9, as shown, as compared with attaching the line 13 directly to the weight. The results are better, too, when the line 13 is of ordinary organic material having no compressive strength or rigidity as compared with the vibration obtained when a thin metallic wire is used for a line.

From the foregoing description it is evident that certain of the advantages of the invention may be obtained though departures are made from the precise construction illustrated. For example, attractive fluttering of the feather 15 is still obtained when the hook 3 is not in the horizontal position which is preferred. It is therefore not intended to restrict the invention to the specific details of construction which have been shown.

As indicated above, it is preferred that the barb be in the vertical plane of the shank, that is in a plane containing a shank 7 and the eye 11. This is to enable the fish to swallow the bait without rolling on its side. Hence, language in the accompanying claims referring to this plane includes such deviations therefrom as do not increase the width of the bait to the point where the fish must roll to conveniently swallow it. In general, this requires that the horizontal width of the hook be substantially less than its vertical height.

The term, "suspended on a line," means still fishing conditions or the absence of substantially lateral water resistance such as is present in trolling when the bait is drawn horizontally through the water. It is obvious that when still fishing, the fishing line will be vertical and the center of gravity of the bait will lie substantially in an extension thereof, a slight offset from this line being required to balance the upward vertical buoyant force on the bait which tends to pivot the shank 7 upward above the eye 11.

What is claimed is:

1. A fish bait for still fishing comprising a single rigid wire-like member that comprises a hook bill at one end, an eye for a fishing line at the other end, a shank including a first portion extending from said hook bill and a second portion rigidly connected to the eye, said hook bill being an extension of the first portion of the shank and lying substantially in a plane containing the first shank portion and the eye, and a weight rigidly secured to the member and having its center of gravity beneath the eye, said bait having a center of gravity located so that it and said eye define a line that is substantially normal to said first shank portion whereby when said line is vertical, e. g., when the bait is suspended in water on a fishing line attached to said eye and there is substantially no horizontal motion of the bait, said first shank portion is substantially horizontal, said bill having a barb adjacent its extremity and on the same side of the shank as the eye, i. e., above the weight.

2. A fish bait for still fishing comprising a weight, eye means for a fishing line rigidly connected to the weight, a hook comprising two legs and a connecting portion rigidly interconnecting the legs, the first of said legs having barb thereon and the second of said legs being rigidly connected with the weight, said legs lying substantially in a plane containing the eye means, said weight being located so that a line defined by the center of gravity of the bait and the eye means is substantially normal to said second leg whereby when said line is vertical, e. g., when the bait is suspended in water on a fishing line secured to the eye means and there is no substantial horizontal motion of the bait, said second leg is substantially horizontal.

HAROLD J. LANDON.

REFERENCES CITED

The following references are of record in the file of this patent:

UNITED STATES PATENTS

| Number | Name | Date |
| --- | --- | --- |
| 1,251,810 | Oehler | Jan. 18, 1918 |
| 1,706,881 | Hampson | Mar. 26, 1929 |
| 1,949,582 | Pott | Mar. 6, 1934 |
| 2,185,666 | Hill | Jan. 2, 1940 |
| 2,274,131 | Edberg | Feb. 24, 1942 |
| 2,315,304 | Upperman | Mar. 30, 1943 |